Patented Dec. 5, 1944

2,364,203

UNITED STATES PATENT OFFICE 2,364,203

ALKYLATION

Alfred W. Francis, Woodbury, N. J., and Ebenezer E. Reid, Baltimore, Md., assignors to Socony-Vacuum Oil Company, Incorporated, New York, N. Y., a corporation of New York No Drawing. Application September 30, 1941, Serial No. 412,957

7 Claims. (Cl. 260—671)

This invention relates to alkylation of aromatic compounds and is particularly concerned with catalytic alkylation of benzene whereby lower alkyl groups are substituted on the benzene molecule under conditions permitting close control of the degree of alkylation.

In many catalytic alkylation reactions involving benzene, the degree of alkylation to the desired product is far short of satisfactory. For example, ethylation of benzene with ethylene or ethyl chloride in the presence of aluminum chloride or other suitable alkylation catalyst, produces mono and poly ethyl benzenes; the first ethylation often appearing to take place at a slower rate than subsequent substitution. In view of the importance of ethyl benzene as an intermediate in making styrene for resins, as an anti-knock fuel for internal combustion engines, as an aromatic solvent and for many other uses; the reaction of ethylene and benzene in the presence of aluminum chloride may be chosen as a representative reaction and the invention described with reference thereto; it being understood that the invention is applicable to other reactions as pointed out hereinafter.

Benzene can be ethylated readily with ethylene (or ethyl chloride) in the presence of catalytic amounts of aluminum chloride at moderate temperatures on the order of 40° to 80° C. These temperature limits common to prior practices are largely determined by the rate of reaction, which decreases at the higher limit because of the limited solubility of ethylene near the boiling point of benzene. The yields obtained by these prior methods are always low, however, because the desired product, ethyl benzene, is ethylated at least as readily as benzene, thereby utilizing a portion of one reactant, ethylene, and a portion of the desired product to produce the undesired poly ethyl benzene.

According to the present invention, the alkylated benzenes of higher degree of alkylation than that desired are retained in the reaction mass containing the catalyst and the reaction is conducted at such temperature that the desired product will volatilize and be thus removed from possibility of further alkylation. The reaction mass is composed of catalyst and higher alkylates than that desired and the reactants are passed therethrough in the gaseous state at a temperature above the boiling point of the desired product but below the boiling point of the next higher alkylate. Although it is preferred that the catalyst containing mass include higher alkylates at the beginning of the reaction, this is not essential, as those higher compounds will accumulate in the mass from compounds formed therein and retained, and those vaporized with the product and returned until a state of equilibrium is achieved.

The invention therefore contemplates alkylation of benzene, including alkyl substituted benzene, by passing the same in the vapor state through a catalyst mass capable of promoting alkylation in company with a gaseous alkylating agent at such conditions of temperature and pressure that the desired product will be volatile while the major proportion of alkylated material having a greater alkyl content than the desired product will remain in the catalyst mass. It is a further aspect of the invention that unreacted benzene and alkylating agent and so much of the alkylates above that desired as may be swept out with the vapors are returned to the catalyst body.

By the process of this invention, it is possible to prepare any desired alkylate of a benzene, where the alkylating agent and the benzene as well as the desired product are gaseous at the conditions of the reaction. It will be seen that a limitation on the scope of feasible use of the invention is based on boiling points of compounds involved in the alkylation reactions. It would not be advisable to employ reactants or attempt to prepare a product boiling above temperatures at which the hydrocarbons present, or any of them, tend to decompose in the presence of the catalyst to a material extent to form cracked products. It is a purpose of the invention however that alkylates of a higher degree of alkylation than that desired shall be dealkylated in the catalyst to give further yield of the desired alkylate and additional alkylating agent.

Suitable alkylating agents are olefins and alkyl halides of relatively short carbon chains, preferably less than four carbon atoms. Similarly, the aromatic compound may be benzene or an alkyl benzene boiling below about 160° C. For example, pure unsubstituted benzene, toluene, cymene, xylenes, butyl benzene, diisopropyl benzene and others may be alkylated with methyl chloride, ethylene, ethyl chloride, isopropyl chloride, butylene, etc., in the presence of a suitable alkylating catalyst. The preferred class of catalysts are those which are frequently designated "Friedel-Crafts type" because they catalyze the classical Friedel-Crafts reaction. Although this group contains many inorganic salts adapted to the invention, such as zinc chloride, ferric chloride and others, we prefer to use aluminum chloride.

Typical of the reactions of this invention is the mono-ethylation of benzene by ethylene in the presence of aluminum chloride. A catalytic body is preferably established by mixing diethyl benzene and aluminum chloride at the elevated temperature of the proposed process to provide a liquid catalyst mass. A mixture of gaseous benzene and ethylene is then bubbled through the catalytic body while the same is maintained at a temperature intermediate the boiling points of benzene and diethyl benzene, preferably between 140° and 150° C. During passage of the gases through the liquid mass there are formed ethyl benzene, diethyl benzene and perhaps some higher polyethyl benzenes. The vapors arising from the surface of the catalyst contain unreacted benzene and ethylene, ethyl benzene and some diethyl benzene which has been carried along with the vaporous material. The desired product, ethyl benzene, is separated from the mixture and liquid diethyl benzene is returned to the catalytic body while benzene and ethylene are recycled to again bubble through the catalyst. De-ethylation of the polyethyl derivatives takes place in the catalytic mass and due to prompt removal of ethyl benzene so formed, the mass reaches a state of equilibrium after a period of time depending on the conditions of the reaction, after which there is no appreciable change in composition thereof. When operated in the above manner, the process results in formation of ethyl benzene from all ethylene and benzene consumed, since all unreacted material and all compounds of higher alkylation than that desired are recycled.

In a typical run for mono ethylation of benzene, using ethylene as the ethylating agent; a mixture of the reactants was carbureted by bubbling ethylene through 50 c. c. of benzene heated to 70° C. by a water bath. The mixed gases were then bubbled through a mixture of 10 grams of aluminum chloride and 50 c. c. of diethyl benzene in deep cylindrical vessel maintained at atmospheric pressure and a temperature of about 140° to 150° C. by means of a glycerol bath. The benzene in the carburetor was replenished from time to time in order to maintain a suitable operating level. In order to show the operation of the process, the distillate from the catalyst was collected over a period of 6.5 hours, during which time a total of 115 c. c. of benzene was added to the carburetor. The distillate so collected aggregated 152 c. c. consisting of 116 c. c. of benzene, 28 c. c. of ethyl benzene and 8 c. c. of diethyl benzene. During continuous operation the unreacted benzene and the undesired diethyl benzene are returned to the reaction zone. the former through the carburetor and the latter directly to the catalytic mass in the liquid form. Throughout the course of the run described above, the activity of the catalyst remained substantially constant, as evidenced by the fact that there was no material change in the composition of the distillate during that period. If the efficiency of the catalyst should fall off because of loss of hydrogen chloride, this effect may be compensated by addition of hydrogen chloride to the reaction mass. During normal continuous operation most hydrogen chloride so lost is returned with recycled ethylene.

It will be apparent that the process is subject to modification in several respects without departing from the concept of invention disclosed above. The proportion of reactants may be varied by changes in the temperature of the aromatic reactant in the carburetor or by adding the reactants separately, either at the same time or alternately. Furthermore, the two stages of the process, alkylation and distillation may be conducted separately to obtain certain advantages. The catalytic alkylation may be conducted under pressure and the product separated from the higher alkylates by subsequent distillation under reduced pressure; dealkylation of the higher alkylated probably taking place in both stages to some extent.

We claim:

1. A process for alkylation of aromatic compounds of the benzene series which comprises passing said compound and an alkylating agent of the class consisting of alkyl halide and olefins in the vapor state through a liquid mass including an alkylation catalyst and over-alkylated aromatic compounds maintained at a temperature between the boiling point of the desired alkylate and the boiling point of the next higher alkylate formed during the alkylation reaction; whereby the major proportion of alkylated material having a greater alkyl content than the desired product will remain in the said liquid mass.

2. A process for alkylation of aromatic compounds of the benzene series which comprises passing said compound and an alkylating agent of the class consisting of alkyl halides and olefins in the vapor state through a liquid mass including an alkylation catalyst of the Friedel-Crafts type and over-alkylated aromatic compounds, maintained at a temperature between the boiling point of the desired alkylate and the boiling point of the next higher alkylate formed during the alkylation reaction; whereby the major proportion of alkylated material having a greater alkyl content than the desired product will remain in the said liquid mass.

3. A process for alkylation of aromatic compounds of the benzene series which comprises passing said compound and an alkylating agent of the class consisting of alkyl halide and olefins in the vapor state through a liquid mass including aluminum chloride and over-alkylated aromatic compounds maintained at a temperature between the boiling point of the desired alkylate and the boiling point of the next higher alkylate formed during the alkylation reaction; whereby the major proportion of alkylated material having a greater alkyl content than the desired product will remain in the said liquid mass.

4. A process for preparing ethyl benzene which comprises passing vapors of benzene and ethylene through a liquid mass including an alkylation catalyst and over-alkylated benzene at a temperature between the boiling points of ethyl benzene and diethyl benzene at the pressure obtaining in the system; whereby the major proportion of alkylated material having a greater alkyl content than the desired product will remain in the said liquid mass.

5. A process for preparing ethyl benzene which comprises passing vapors of benzene and ethylene through a liquid mass including an alkylation catalyst of the Friedel-Crafts type and over-alkylated aromatic compounds, at a temperature between the boiling points of ethyl benzene and diethyl benzene at the pressure obtaining in the system; whereby the major proportion of alkylated material having a greater alkyl content than the desired product will remain in the said liquid mass.

6. A process for preparing ethyl benzene which comprises passing vapors of benzene and ethylene through a liquid mass including aluminum chloride and over-alkylated aromatic compounds at a temperature between the boiling points of ethyl benzene and diethyl benzene at the pressure obtaining in the system; whereby the major proportion of alkylated material having a greater alkyl content than the desired product will remain in the said liquid mass.

7. A process for preparing ethyl benzene which comprises passing benzene and ethylene in the vapor state through a liquid mass including aluminum chloride and diethyl benzene at about atmospheric pressure and a temperature of about 140° to 150° C., and separating ethyl benzene from the effluent vapors.

ALFRED W. FRANCIS.
EBENEZER E. REID.